Nov. 22, 1932.  S. M. CHASE  1,888,451
TRAILER TRUCK
Filed Dec. 20, 1929    3 Sheets-Sheet 1
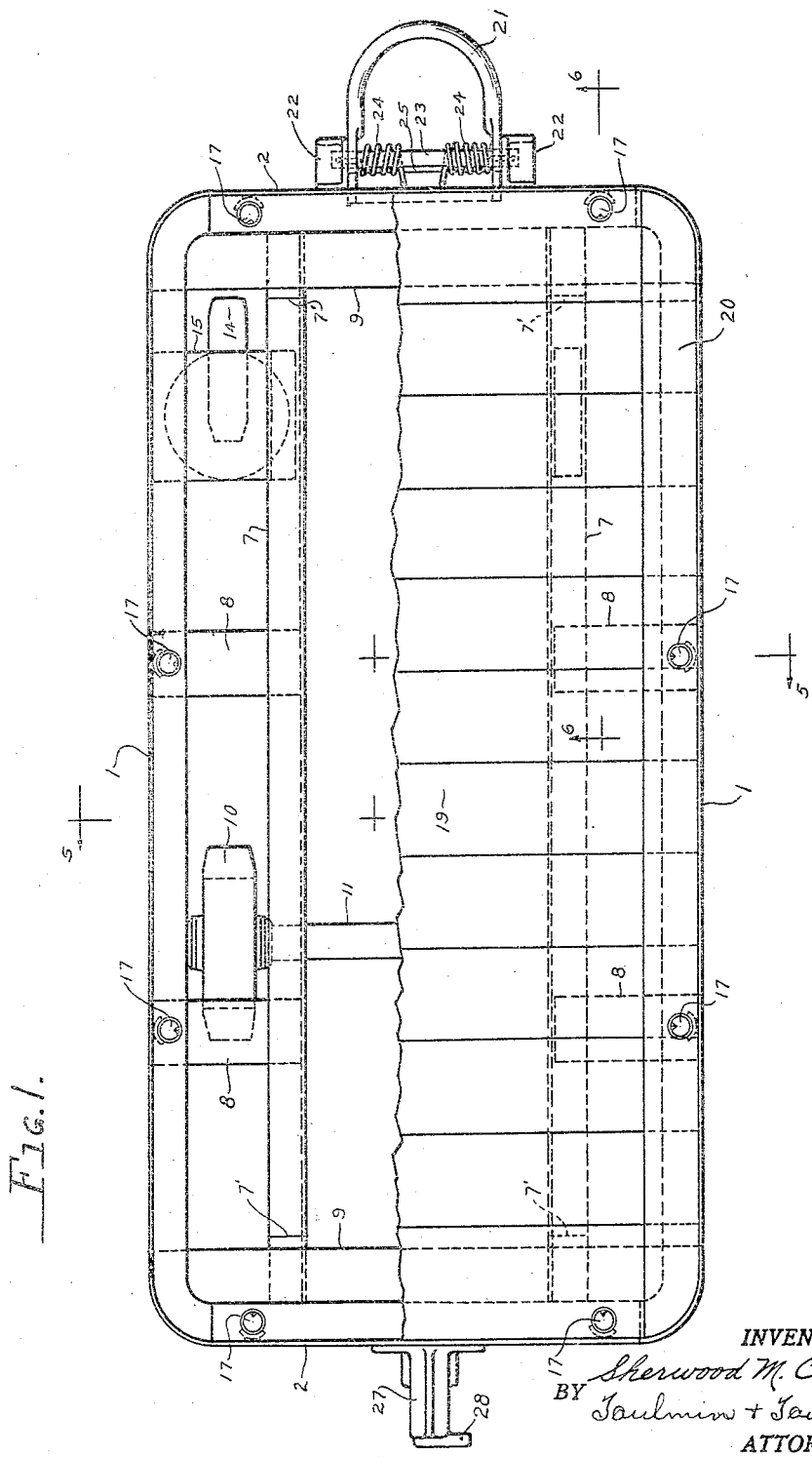
INVENTOR
Sherwood M. Chase.
BY Toulmin + Toulmin
ATTORNEY

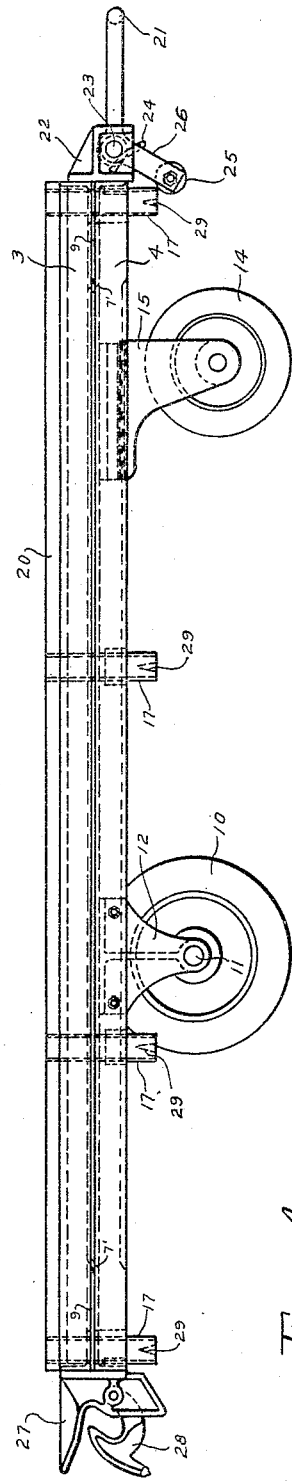
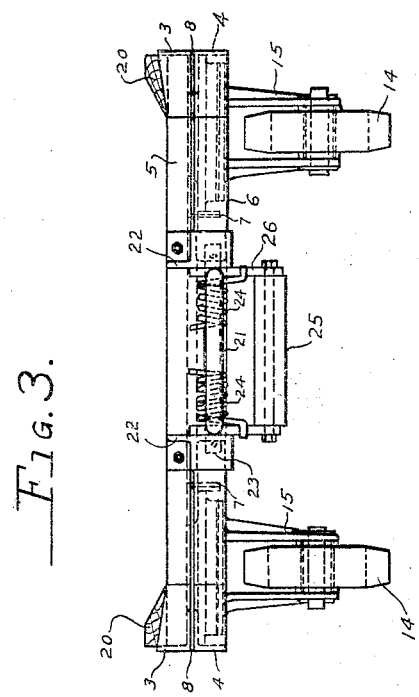
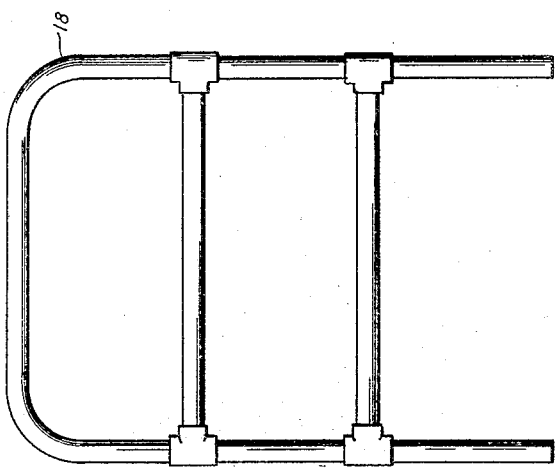

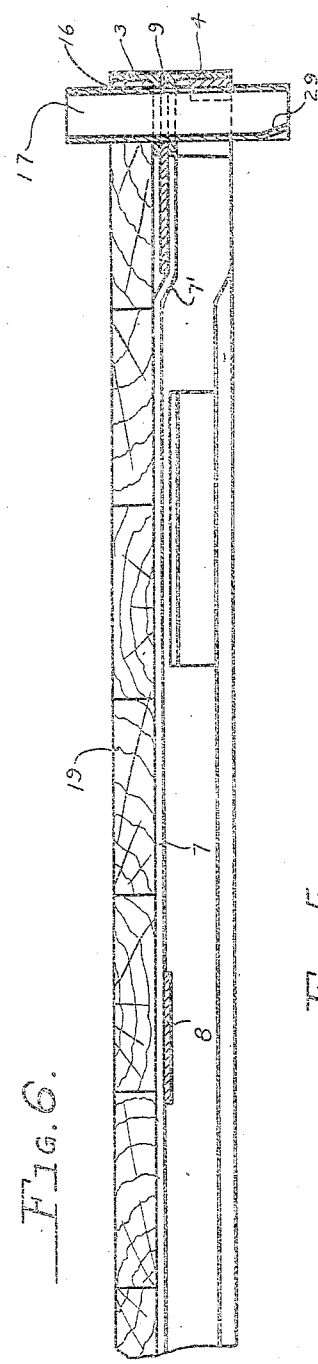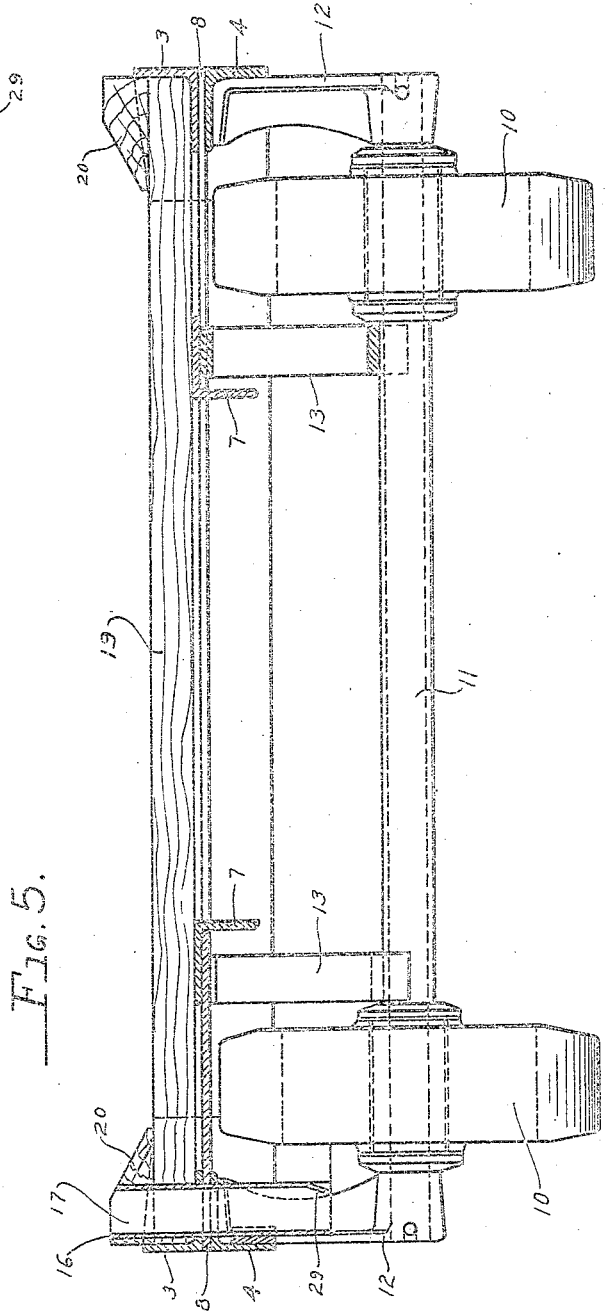

Patented Nov. 22, 1932

1,888,451

UNITED STATES PATENT OFFICE

SHERWOOD M. CHASE, OF COLUMBUS, OHIO, ASSIGNOR TO THE CHASE FOUNDRY AND MFG. CO., OF COLUMBUS, OHIO, A CORPORATION OF OHIO

TRAILER TRUCK

Application filed December 20, 1929. Serial No. 415,388.

This invention relates to improvements in trucks, and particularly to improvements in trailer trucks.

It is an object of this invention to provide a truck frame having side sills and end sills forming the rim of the truck frame composed of sections formed of angle irons.

It is also an object of this invention to provide a frame having side sills and end sills thus formed with intermediate longitudinal sills composed of angle irons, the ends of which are attached to the end sills.

It is a further object of this invention to provide in a truck frame means for adding strength and rigidity thereto in the form of reenforcing plates located between the angle bars, forming the side sills and the end sills, one end of certain of these reenforcing bars being in contact with the intermediate sills.

It is also an object of this invention to provide, in connection with the side sills and end sills, means for forming sockets in which stakes are located for the purpose of protecting the load on the truck from falling off.

It is a still further object of this invention to provide, in connection with a truck frame of the form here described, means for attaching one trailer truck to another. This means consists of a bail pivotally attached to one end of the truck frame. This bail is so attached to the frame that it will adjust itself to an uneven condition of the trucks one with the other so that one truck may be attached to an immediately adjacent truck through they may not be in horizontal alignment.

It is also an object of this invention to provide, in connection with a bail of this kind, means for retaining the bail in substantially horizontal position, and forcing it back into horizontal position when it shall have been brought to some other position and released therefrom.

These and other objects will be apparent from the following description taken in connection with the drawings.

Referring to the drawings:

Figure 1 is a top plan view of the truck with a part of the floor removed.

Figure 2 is a side view of the truck.

Figure 3 is an end view of the truck showing the bail.

Figure 4 is a side view of a standard or stake.

Figure 5 is a vertical cross section through one end of the truck, showing the rollers supporting that end and the means for supporting a stake.

Figure 6 is a fragmentary section showing the construction of the sills.

In Figure 1 there is shown a top plan view of the truck with part of the floor removed. The outer or peripheral part of the truck frame may be termed a rim and is composed of side sills 1 and end sills 2. The side sills are formed in two sections, an upper section 3 and a lower section 4. The end sills are likewise composed of sections, the upper section 5 and a lower section 6. These sections are composed of angle irons placed one above the other in slightly spaced relationship, one side of one angle iron being parallel to one side of the other angle iron, the other sides of the angle irons being in substantially vertical alignment and forming the outer edge of the truck frame.

Extending longitudinally of the truck frame are two intermediate longitudinal bars 7, also formed of angle irons. Between the angle irons that form the side sills are reenforcing plates 8. One of the ends of these reenforcing plates is between the angle irons that form the side sills, while the other end of these reenforcing plates is in contact with the longitudinal sill with the horizontal side of the longitudinal sill resting upon the inner ends of these reenforcing plates. The end sills are also provided with longitudinally arranged reenforcing plates 9, one at each end of the frame between the angle irons that constitute the end sills of the frame. The intermediate bars or sills are crimped at their ends 7', where they connect onto the reenforcing plates 9. These reenforcing plates cooperate with the sills in forming a rigid and durable frame. They also cooperate with the sills in forming means for supporting stakes or standards, hereinafter described.

One end of the truck is supported by wheels 10. For the purpose of carrying these wheels there is provided an axle 11 supported at each end by brackets 12 attached to the side sills of the frame. Extending downwardly from the frame adjacent the longitudinal sills are brackets 13. The lower ends of these brackets rest upon the axle and help to support the central or middle part of the frame. At the other end of the frame from the wheels 10 are located swivel wheels 14. These wheels are each supported by a pair of brackets 15 swivelly attached to the frame of the truck.

Extending through the angle irons forming the side sills and the ends of the reenforcing plates between the angle bars there are holes 16 for the purpose of receiving tubes 17. These tubes form sockets in which one of the ends of standards or stakes rests. One form of stake is shown in Figure 4. Any other form convenient might be used. This tube is attached to a side sill in such a way that it becomes a part thereof and is affixed thereto. The use of the reenforcing plates between the angle irons that form the side sills adds an increased support by which the tubes 17 are more securely and firmly held in place. The stakes or standards are indicated by the numeral 18.

The numeral 19 indicates the floor of the truck. This floor is supported by the horizontal sides of the upper angle bars and by the longitudinal sills. Around the sides are beveled edges 20. These beveled edges are for the purpose of preventing the load from being jolted or jostled off the floor, and form partially raised surfaces for that purpose.

To one end of the truck frame there is attached a coupler bail 21. This bail is attached to the frame by means of brackets 22 and a pivot rod 23 passing through the brackets and the ends of the bail. For the purpose of retaining the bail in horizontal position, or bringing it back to horizontal position when it has been forced into other positions, there is provided a weight 25 supported by arms 26 extending down from the bail. Springs 24, coiled around a rod 23 and suitably attached at one end to the bail and at the other end to the frame, prevent the bail from being thrown out of position by sudden contact with the other part 28 of the coupler.

There is one of these bails located at one end of each car, while the other end of the car is provided with a cooperating coupler member 27, which has pivotally attached thereto a hook jaw 28. The purpose of this hook 28 is to receive the bail 21 for the purpose of uniting cars together to form a train of cars. When the bail 21 shall have been raised for any purpose the weight and spring will bring it back to its normal horizontal position so that it may readily engage the coupler member on the other end of an adjacent car.

From the nature of the coupler member 27 and its cooperating hook the bail 21 may be received therein though the bail is in different positions, and the bail may be raised to suit the height of the car to which it is being attached because of its pivotal connection with the brackets that support it. For the purpose of preventing the stakes or standards passing through the socket 17 there may be provided on the lower end of each socket a stop member 29. Any suitable form of stop member may be used.

It is obvious from the foregoing description that applicant has provided a truck composed of few parts united in a suitable and permanent way and in such a fashion that the standards at each side and each end of the truck are supported in secure and well attached socket bars in the form of tubes. The socket members at the ends of the truck are similar to those at the sides and similarly formed, except for the fact that they do not extend above the floor. Socket members constructed as provided in the side and end sills form means for holding the stakes or standards so that they are practically immovable as far as the frame is concerned, and before the parts of the frame that support the stakes or standards will give the standards will tend themselves to break.

I desire to comprehend within my invention such modifications as may be clearly embraced within my claims and the scope of my invention.

Having thus fully described my invention, what I claim is new and desire to secure by Letters Patent, is:

1. In a truck, a frame having side sills, each sill being formed of a pair of angle irons, one side of one angle iron being parallel to one side of the other angle iron, and the other sides of both angle irons being in the same plane, and a plurality of reenforcing plates having one of their ends between the parallel sides of said angle irons, there being an aligned hole through each reenforcing plate and the parallel sides of the angle irons adjacent the other sides of said angle irons for the purpose of stake sockets.

2. In a truck, a frame having side sills, each sill being formed of a pair of angle irons, one side of one angle iron being parallel to one side of the other angle iron and the other sides of both angle irons being in the same plane, a plurality of reenforcing plates having one of their ends between the parallel sides of said angle irons, there being an aligned hole through each reenforcing plate and the parallel sides of the angle irons adjacent the other sides of said angle irons, and a tube in each hole and united with the sides of said angle irons to form stake sockets.

3. In a truck, side and end sills, each composed of a pair of angle irons and having an upper and a lower section, the outer edges of the truck being formed by oppositely extending sides of the angle irons, and built in reenforcing plates between the sections of the end sills and between the ends of the side sills.

4. In a truck, a frame having side and end sills, each composed of angle irons having oppositely extending sides forming the outer edges of the truck, and reenforcing plates embedded in the end sills and in the ends of the side sills to hold the truck square to reenforce the frame for couplers and to prevent elongation of the frame under strain.

In testimony whereof, I affix my signature.
SHERWOOD M. CHASE.